W. REINHARD.
Carriage-Wheel Hub.
No. 207,303. Patented Aug. 20, 1878.
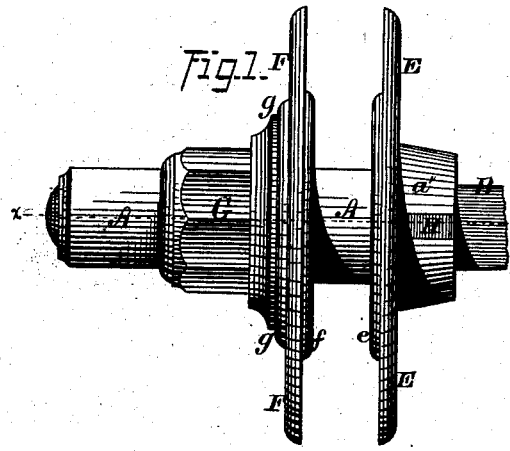
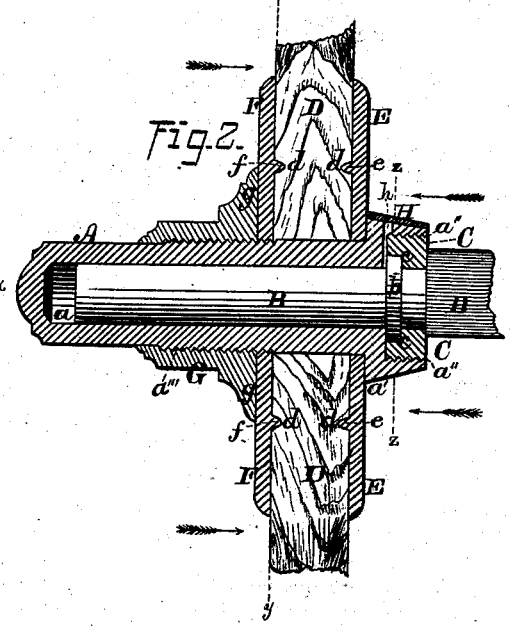
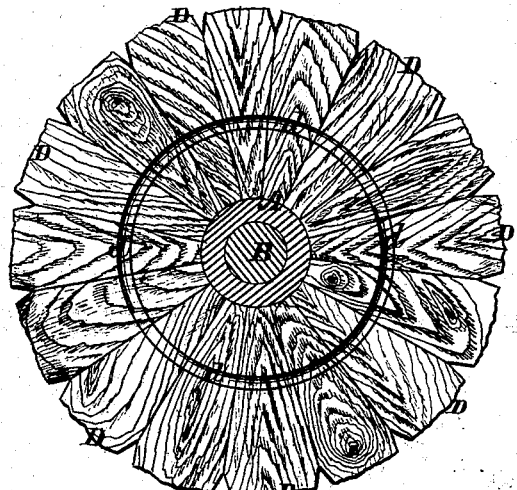
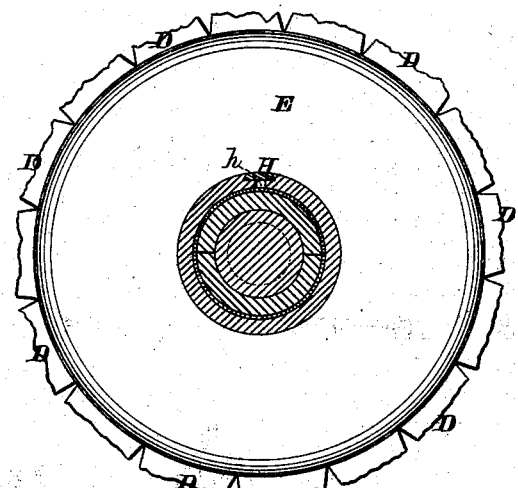
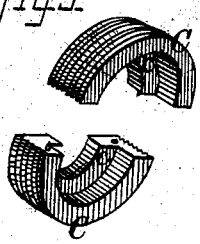
WITNESSES:
Jas E. Hutchinson
Henry C. Hazard
INVENTOR
Wm Reinhard, by
Prindle & Co his Attys

UNITED STATES PATENT OFFICE.

WILLIAM REINHARD, OF EAU CLAIRE, WISCONSIN.

IMPROVEMENT IN CARRIAGE-WHEEL HUBS.

Specification forming part of Letters Patent No. 207,303, dated August 20, 1878; application filed May 13, 1878.

*To all whom it may concern:*

Be it known that I, WILLIAM REINHARD, of Eau Claire, in the county of Eau Claire, and in the State of Wisconsin, have invented certain new and useful Improvements in Hubs for Carriage-Wheels; and do hereby declare that the following is a full, clear, and exact description thereof, reference being had to the accompanying drawing, making a part of this specification, in which—

Figure 1 is a side elevation of my improved hub, the spokes being removed. Fig. 2 is a central longitudinal section of the same upon line $x$ $x$ of Fig. 1, said spokes being in place. Fig. 3 is a transverse section upon line $y$ $y$ of Fig. 2. Fig. 4 is a like view upon line $z$ $z$ of said figure, and Fig. 5 is a perspective view of the nut employed for securing the hub upon the axle-arm.

Letters of like name and kind refer to like parts in each of the figures.

The design of my invention is to increase the strength and durability of a carriage-wheel, and to render more easy repairs of the spokes; to which end it consists in the peculiar construction of the hub and its combination with the axle-arm and spokes, substantially as and for the purpose hereinafter shown.

In the annexed drawing, A represents the thimble of my hub, which interiorly has a round straight opening, $a$, for the reception of the axle-arm B. The outer end of the thimble A is permanently closed, while its inner end is enlarged, as shown, and within such enlargement $a'$ is formed a recess, $a''$, which is concentric with the axial opening $a$, and is threaded interiorly, so as to receive a nut, C, that is threaded exteriorly. The nut C is provided within its outer end with a recess, $c$, which corresponds to and receives a collar, $b$, that is formed upon the axle-arm B; and in order that said nut may be placed in position, it is divided longitudinally and the sections secured in relative positions by means of two dowel-pins, $c'$, which are secured within their contiguous faces and project into suitable recesses.

As the collar $b$ of the axle-arm B wears, so as to cause end shake of the thimble A, the sectional nut C should have its inner end dressed off, so as to lessen the depth of the recess $c$ and reduce such end shake or longitudinal motion of said thimble to the required amount. The same result may be secured by placing a number of thin washers between the inner end of said nut and the bottom of the recess $a''$ when the parts are fitted together, and removing one of said washers whenever there is too much end shake.

The screw-threads upon the nuts and within the recesses are made right and left hand, respectively, for the right and left axle-arms, so as to cause the forward motion of the wheels to keep said nuts from being disengaged from said recesses. By this means for securing the axle-arm within the thimble perfect security is afforded, and all dirt and dust are excluded from the bearing parts, and all cutting or unusual wear from the fouling of the lubricant employed is prevented.

From the outer end of the enlargement $a'$ outward to a distance equal to the width of a spoke, D, the exterior of the thimble A is plain and straight, while beyond such portion is provided a screw-thread, $a'''$, which extends midway to the end of said thimble, and from thence outward the latter is reduced to the diameter of the bottom of said thread. A metal collar, E, fitted over the thimble A against the forward end of the enlargement $a'$, receives and sustains the inner edges of the spokes D, while a second similar collar, F, is fitted over said thimble, against the front edges of said spokes. A nut, G, having a flanged or enlarged inner end, $g$, is fitted over the threaded portion of the thimble A, with its said flanged end bearing against the outer face of the collar F, presses said collar inward, and closely confines the spokes D between the same and the rear collar E. The inner ends of the spokes D are wedge-shaped, so that when combined they form a solid arch within the plates or collars E and F; and in order to more closely confine said spokes in position, each of said collars is provided upon its inner face with a concentric flange, $e$ or $f$, which has a V shape in cross-section, and extends horizontally into a correspondingly-shaped groove, $d$, that is formed within the edges of said spokes, by which arrangement the latter are so firmly held in longitudinal position as to prevent their displacement by accident.

The hub thus constructed is strong and durable, and its parts are easily and quickly separated when necessary, while from the slight reduction required in the transverse dimensions of the spokes the strength of the latter is not materially impaired, and their life and wear are considerably greater than when used with hubs of ordinary construction.

A dovetailed slide, H, fitted within a corresponding recess in the enlarged portion $a'$ of the thimble A, incloses a radial opening, $h$, in the latter, through which oil may be passed into the interior of said thimble.

Having thus fully set forth the nature and merits of my invention, what I claim as new is—

The hereinbefore-described wheel-hub, in which the thimble A, having the central opening $a$, enlarged inner end $a'$, threaded recess $a''$, and threaded periphery $a'''$, the sectional nut C, provided with the recess $c$, the collars E and F, having concentric ribs $e$ and $f$, respectively, upon their contiguous faces, and the nut G, provided with a flanged inner end, are constructed and combined with each other and with the axle-arm B $b$ and spokes D $d$, in the manner and for the purpose substantially as shown.

In testimony that I claim the foregoing I have hereunto set my hand this 27th day of December, 1876.

WILLIAM REINHARD.

Witnesses:
   J. F. ELLIS,
   W. H. ELLIS.